Mar. 27, 1923.
W. G. GOMEZ.
TRACTOR.
FILED FEB. 3, 1922.
1,449,597.
3 SHEETS—SHEET 1.
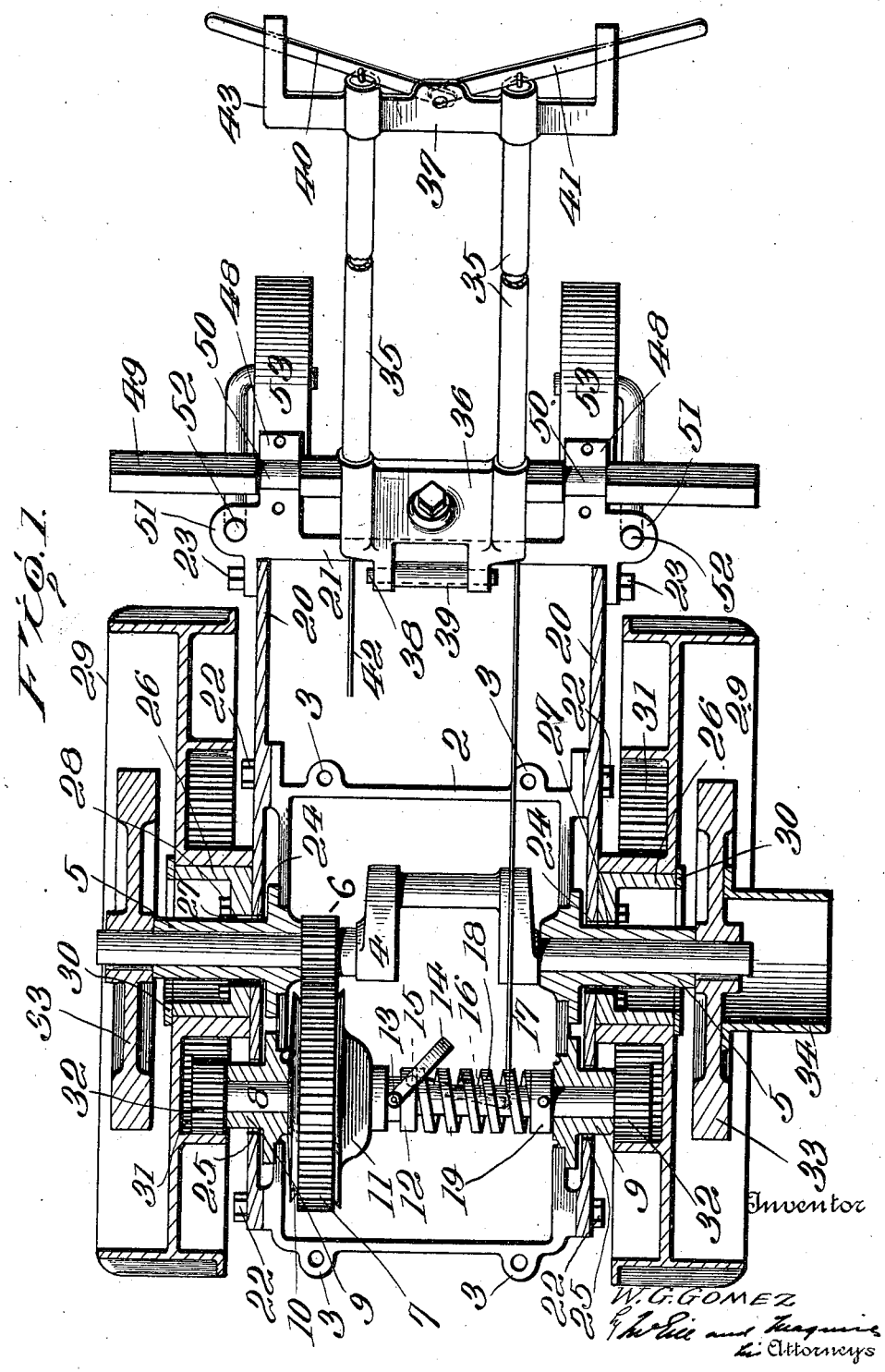

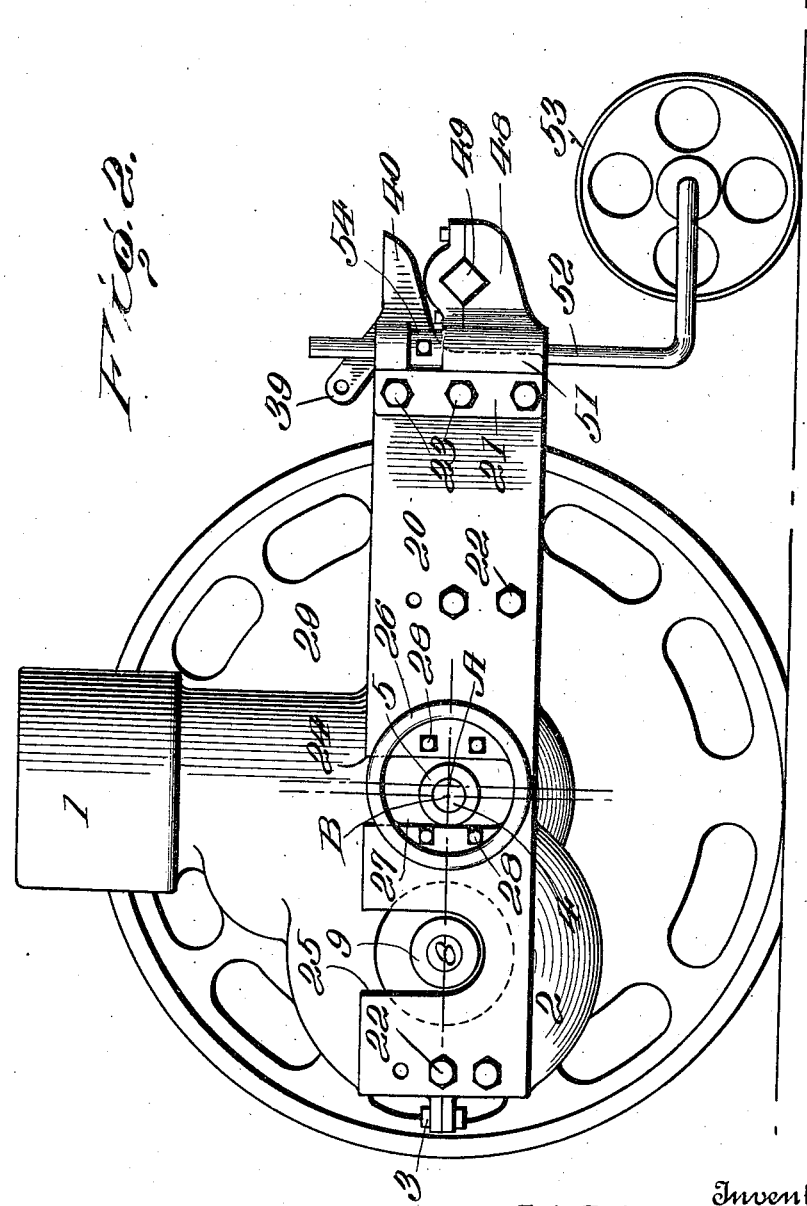

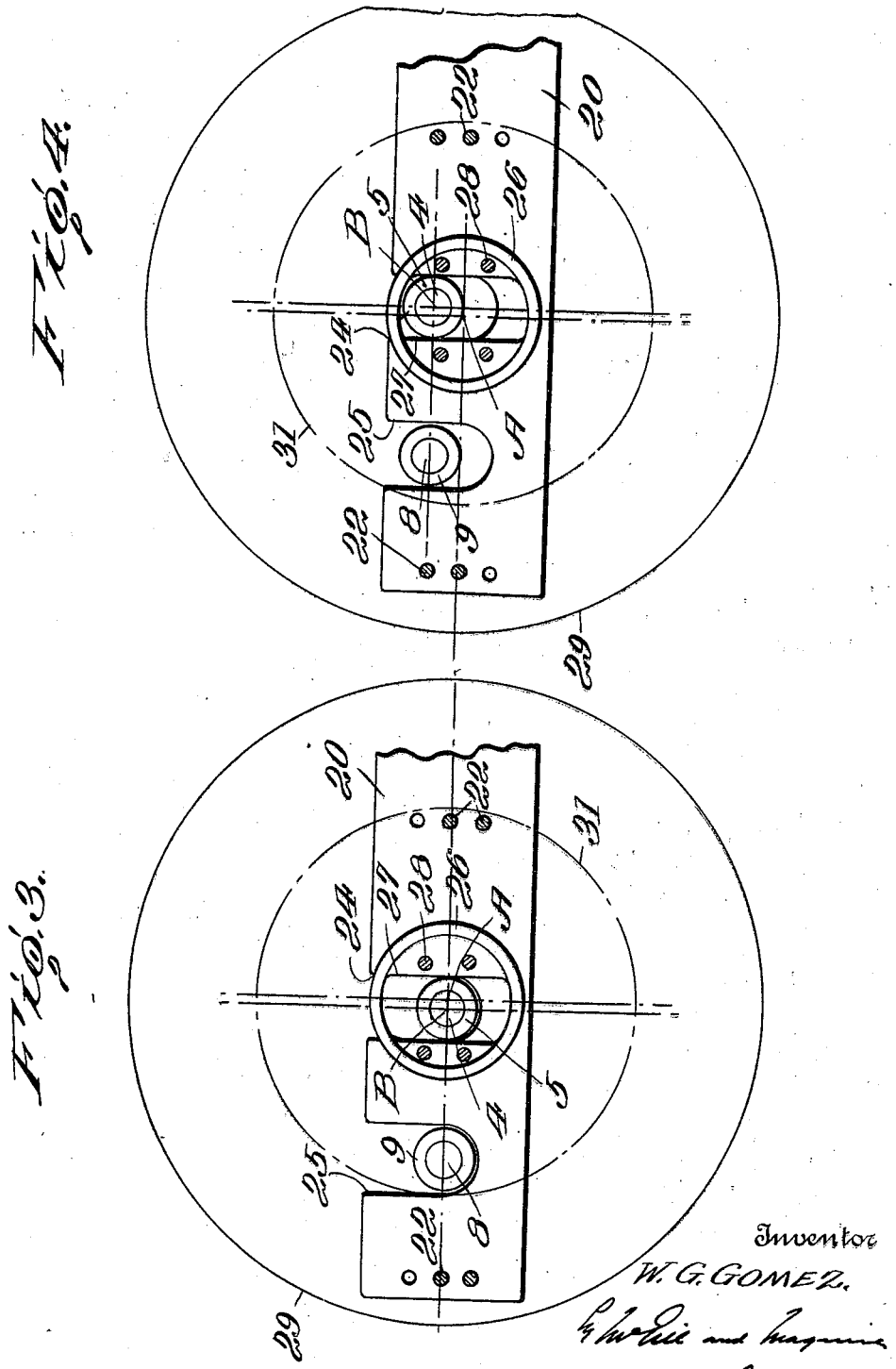

Patented Mar. 27, 1923.

1,449,597

UNITED STATES PATENT OFFICE.

WILLIAM G. GOMEZ, OF BUFFALO, NEW YORK.

TRACTOR.

Application filed February 3, 1922. Serial No. 533,951.

*To all whom it may concern:*

Be it known that I, WILLIAM G. GOMEZ, of Buffalo, in the county of Erie and State of New York, have invented certain new and useful Improvements in Tractors; and I do hereby declare the following to be a full, clear, and exact description of the invention, such as will enable others skilled in the art to which it appertains to make and use the same.

My invention relates to tractors, and particularly to that type of small two-wheeled machines used for gardening and commonly referred to as "garden" tractors. In machines of this class it is essential that the parts be constructed and arranged as compactly as possible and with the weight so distributed as to insure easy steering and without liability of overturning in the tilting movements as it passes over uneven ground and this has necessitated low hanging of the driving mechanism relative to the carrying wheels. This is not objectionable in the use of the machine for plowing and some other ground working operations, but in using a tractor with cultivating devices, it is desirable to have a fair clearance between the driving mechanism and the tops of the growing crops to avoid damage to the latter.

It is the object of my invention to provide an improved tractor wherein adjustment may be made to provide greater clearance beneath the motor when the machine is used in drawing cultivating implements, and I accomplish this end by means of a frame which supports the motor and on which the carrying wheels are mounted, simple and efficient means being employed for locking the motor in one of a plurality of positions on the frame, the carrying wheels being supported on trunnions which are adapted for turning movement so as to compensate for relative displacement of the crank shaft of the motor and the driving connection with the carrying wheels.

In the drawings, Figure 1 is a horizontal transverse section through the center of my improved tractor on the line of the crank shaft. Figure 2 is a side elevation with one of the carrying wheels removed to disclose the construction of the frame member and the wheel journal. Figures 3 and 4 are diagrammatic views, the former showing the position of the motor (in dotted lines) in its lower position in the frame, and Figure 4 indicating the raised position.

In the figures of the drawing, 1 represents an internal combustion engine of the character ordinarily used for tractors of the two-wheel or garden type, and 2 the crank case thereof. This crank case is preferably split on the center line of the crank shaft so as to permit of the easy introduction of the working parts, the two halves being bolted together in the usual manner. The crank shaft 4 of the engine is carried in horizontal bearings 5 secured to the sides of the crank case 2. This crank shaft is provided with a pinion 6 which meshes with a gear 7 on a counter-shaft 8, journalled in bearings 9 arranged at one side of the crank shaft and extending in parallelism therewith. The gear 7 is loosely mounted on the countershaft 8 and forms one part of a clutch device. This countershaft is made in two parts, each of which has a complementary clutch member fastened thereto, one clutch member 10 being preferably formed integral with one part of the countershaft and the other clutch member 11 keyed for sliding movement on the complementary part of the countershaft. The clutch member 11 has a grooved hub 12 in which rollers 13 carried by a yoke 14 are adapted to ride. The yoke 14 is pivoted at 15 to the crank case and has a crank arm 16 to which is attached a clutch rod 17 whereby the yoke may be rocked on its pivots so as to move the clutch member 11 longitudinally on the countershaft against the tension of a heavy spring 18 encircling the countershaft between the hub 12 and a collar 19 fastened thereon. That portion of the crank shaft inside the bearings 5, the countershaft, clutch, and clutch operating mechanism described are all contained within the crank case of the engine and are, accordingly, protected from dust. These parts may operate in a bath of oil for complete lubrication.

The engine, including its crank case, is carried in a frame which consists of two parallel longitudinally extending side members 20, these members being connected at their rear ends by a transverse member 21. The side members 20 are secured to the crank case of the engine by bolts 22 and to facilitate proper aligning and fastening of the frame members to the engine crank case, both may be provided with pads where the fastening bolts 22 are located and which pads can be machined to insure proper fitting. The transverse member 21 is secured to the extremities of side members 20 by bolts 23, as shown in Figures 1 and 2. Each of the side frame members is provided with elongated upwardly extending openings 24 and 25. The crank shaft bearings 5 and countershaft bearings 9 pass through these openings which are of such form and size as to permit the position of the bearings 5 and 9 being altered in a vertical plane. Secured to each of the side frame members 20 is a detachable trunnion or journal 26, these trunnions having elongated openings 27 which are in alignment with the openings 24 in the frame to permit passage of the bearings 5 for the crank shaft. The trunnions are bolted to the frame, as indicated at 28, and support carrying wheels 29 which are held in place by a retaining plate 30 removably secured at the outer side of the trunnion. The slots of the trunnions are offset relative to the vertical center of said trunnions, that is, the longitudinal axis of the slots is eccentric to the vertical center line of the trunnions. This will be clearly understood from the diagrammatic showing of Figures 3 and 4. It will be noted that the axial center A of each journal 26 is eccentric with respect to the axial center B of the countershaft 4, the eccentricity being in a vertical plane for convenience of illustration. It is quite feasible to effect an eccentric centering of these parts in both a vertical and horizontal plane. To accomplish this eccentric positioning of the slots of the frame and the trunnions, the bolt holes in the trunnions by which the latter are secured to the frame by the bolts 28 are at equi-distance from the side walls of the slots 27, and the bolt holes in the frame complementary to the bolt holes of the trunnions are similarly placed at an equal distance from the side walls of the elongated openings 24, this arrangement allowing the trunnions to be fastened in two positions, differing from each other by 180°. The carrying wheels 29 each have an internal gear 31 which may be formed integral therewith, or made separate and appropriately fastened thereto. This internal gear is arranged for operative engagement with driving pinions 32 keyed to the extremities of the countershaft 28. Each end of the crank shaft 4 extends beyond its bearing 5 sufficiently to take a fly wheel 33, the entire construction being such that the fly wheel is located inside the edge of the carrying wheel. One of these fly wheels is provided with a pulley 34 projecting beyond the edge of the carrying wheel, and from which pulley power may be taken through a belt.

The tractor is steered by means of a pair of steering posts 35 which have their lower ends fastened to a pivotal member 36 and their outer ends connected by handle bar 37. The member 36 is pivoted by a pin 38 to a lug 39 extending above and forming a part of the transverse frame member 21, and is supported so as to have a limited oscillating movement in a vertical plane. The handle bar 37 is provided with hand grips and operating levers 40 and 41 which are connected respectively to the engine throttle (not shown) and the clutch operating crank 16 by means of a throttle rod 42 and clutch rod 17. Steering and controlling mechanism of the type shown is not new, but differs from similar mechanism of known tractors in that it is attached to the frame of the tractor and not directly to the engine or its crank case.

The transverse member 21 has rearwardly extending lugs 48 forming bearings for a draw bar 49. This draw bar is preferably made square or of other angular cross section, to provide for the easy attachment of the agricultural implements and has journals 50 machined thereon adapted for seating in the bearings in the lugs to permit rotation of the draw bar on a longitudinal axis. The bearings 48 are preferably split so as to provide for the easy assembling of the draw bar therein, the upper half consisting of caps fastened in place in the usual manner. This transverse member 21 also has laterally extending lugs 51 which form bearings for shanks 52 upon which caster wheels 53 are carried. The shanks 52 have a swivel motion inside the lugs 51, being adjustably held against displacement by collars 54 encircling the shanks and seated in pockets cut out in the lugs 51.

In the raising of the engine in the frame, it is necessary that the internal gear 31 on the carrying wheel will properly mesh with the driving pinion 32 on the countershaft, and this requires that the axis of the countershaft and the axis of the trunnion be the same distance apart as in the previous position. I accomplish this end by reversing the position of the trunnion. Again referring to the diagrammatic showing in Figures 3 and 4, it is to be noted that the bolt holes of the trunnions, heretofore described as arranged equi-distant from the walls of the slot are four in number, and are so located that the intersection of the diagonals passing through these bolt holes is eccentric with respect of the axis of the trunnion bearing surface. Accordingly, when the trunnion is rotated from the position shown in Figure 3 through 180° to the position shown in Figure 4 and the fastening bolts are replaced, the axis of the trunnion bearing surface is moved to the opposite side of the vertical plane passing through the axis of the crank shaft. In other words, in the arrangement shown in Figures 2 and 3 the axis of the trunnion is located to the right of the axis of the crank shaft 4, whereas, as seen in Figure 4 (with the trunnions rotated 180° from the position of Figure 3) the axis of the trunnion is between the axis of the crank shaft 4 and the countershaft 8. The side frame members 20 through which the fastening bolts 22 pass are provided with holes so spaced that the same bolts are used in fastening the engine to the frame in both positions.

The construction described is such that a ready change of position of the engine relative to the frame may be made without interfering with the interdependence of the various parts and that in so altering the position of the engine there is no change of vertical position between the frame and the carrying wheels, the parts being so arranged that variation in location of the engine with consequent raising or lowering of the crank shaft and the countershaft merely necessitates the partial turning of the trunnions for the carrying wheels so as to accommodate the changed position of the crank shaft.

I claim as my invention:

1. A tractor including a frame having side members provided with openings, carrying wheels, an engine having a casing secured to said frame and a crank shaft extending through alined openings of said frame, a driving connection between said crank shaft and said carrying wheels, and means for mounting said wheels on said frame whereby the relative positions of said engine and frame may be varied in respect of said wheels.

2. A tractor including a frame having side members provided with openings, carrying wheels, an engine having a casing secured to said frame and a crank shaft extending through alined openings of said frame, a driving connection between said crank shaft and said carrying wheels, and means for mounting said wheels on said frame whereby the position of said crank shaft and driving connection may be varied relative to said frame.

3. A tractor including a frame having side members provided with openings, carrying wheels, an engine having a casing secured to said frame and a crank shaft extending through alined openings of said frame and through said carrying wheels, a driving connection between said crank shaft and said carrying wheels, and means for mounting said wheels on said frame whereby the position of said crank-shaft and driving connection may be varied relative to said frame and wheels.

4. A tractor including a frame having side members each provided with elongated openings, carrying wheels, an engine having a casing secured to said frame and a crank shaft extending through alined openings of said frame and through said carrying wheels, a driving connection between said crank shaft and said carrying wheels, said connection extending through other openings of said frame, and means adapted to assume a plurality of positions for mounting said wheels on said frame, said means permitting change of position of said crank shaft and driving connection relative to said wheels.

5. A tractor including a frame having side members provided with openings, carrying wheels, an engine having a casing secured to said frame and a crank shaft extending through alined openings of said frame and through said carrying wheels, a driving connection between said crank shaft and said carrying wheels, said connection extending through other openings of said frame, and means adapted to assume a plurality of positions for mounting said wheels on said frame, said means permitting vertical variation of said crank shaft and driving connection in the openings of said frame.

6. A tractor including a frame having side members provided with openings, carrying wheels, an engine having a casing secured to said frame and a crank shaft extending through alined openings of said frame and through said carrying wheels, a driving connection between said crank shaft and said carrying wheels, and means for mounting said wheels on said frame, said means having an elongated slot through which said crank shaft extends, the longitudinal center of said slot being offset to the center of said means, to permit vertical variation of said crank shaft relative to said wheels.

7. A tractor including a frame having side members provided with openings, carrying wheels, an engine having a casing secured to said frame and a crank shaft extending through alined openings of said frame and through said carrying wheels, the axes of said shaft and wheels being eccentric, a driving connection between said crank shaft and said carrying wheels, and means adapted to assume a plurality of positions for mounting said wheels on said frame, whereby the eccentric position of said crank shaft relative to said wheels may be varied.

8. A tractor including a frame having side members each provided with elongated openings, carrying wheels, an engine having a casing adjustably secured to said frame, a crank shaft extending through alined openings of said frame and through said carrying wheels, a driving connection between said crank shaft and said carrying wheels, trunnions variably positioned on said frame and on which said carrying wheels are mounted, each of said trunnions having a slot the longitudinal axis of which is offset to the axis of said trunnion to permit the position of said crank shaft and driving connection to be varied relative to said wheels in adjusting said motor on said frame.

9. A tractor including a frame having side members each provided with elongated openings, carrying wheels, an engine having a casing adjustably secured to said frame, a crank shaft extending through alined openings of said frame and through said carrying wheels, a driving connection between said crank shaft and said carrying wheels, means permitting the raising and lowering of said engine with its crank shaft in said frame while maintaining driving connection with said wheels, said means including trunnions bolted on said frame and on which said carrying wheels are mounted, each of said trunnions having a slot the longitudinal axis of which is offset to the axis of said trunnion, and through which said crank shaft extends, the vertical center of said crank shaft being to one side of the vertical center of said trunnions in one position of the latter and on the opposite side when said trunnion is rotated 180°.

10. A tractor including a frame having side members each provided with upwardly extending openings, a trunnion secured to each side member adjacent an opening by bolts passing through holes in said member equi-distant from the sides of said openings, carrying wheels on said trunnions, each trunnion having a slot the longitudinal axis of which is offset to the vertical center of said trunnion, and bolt holes on each side of said slot equi-distant therefrom, whereby when said trunnion is given a half rotation the longitudinal axis of said slot and the vertical center of said trunnion will be in reverse position, in combination with an engine having a casing adapted to be secured to said frame, in one of a plurality of positions, a crank shaft extending through alined openings of said frame and through said wheels, and a driving connection between said shaft and said wheels extending through the other alined openings of said frame.

In testimony whereof I have signed this specification.

WILLIAM G. GOMEZ.